Feb. 12, 1924.

G. B. RUNYAN

MEAT CUTTER

Filed May 22, 1923　　2 Sheets-Sheet 1

1,483,617

WITNESSES
M. Fowler

INVENTOR
Geniah B. Runyan.

BY
Munn &Co.

ATTORNEYS

Feb. 12, 1924.  
G. B. RUNYAN  
MEAT CUTTER  
Filed May 22, 1923  
1,483,617  
2 Sheets-Sheet 2
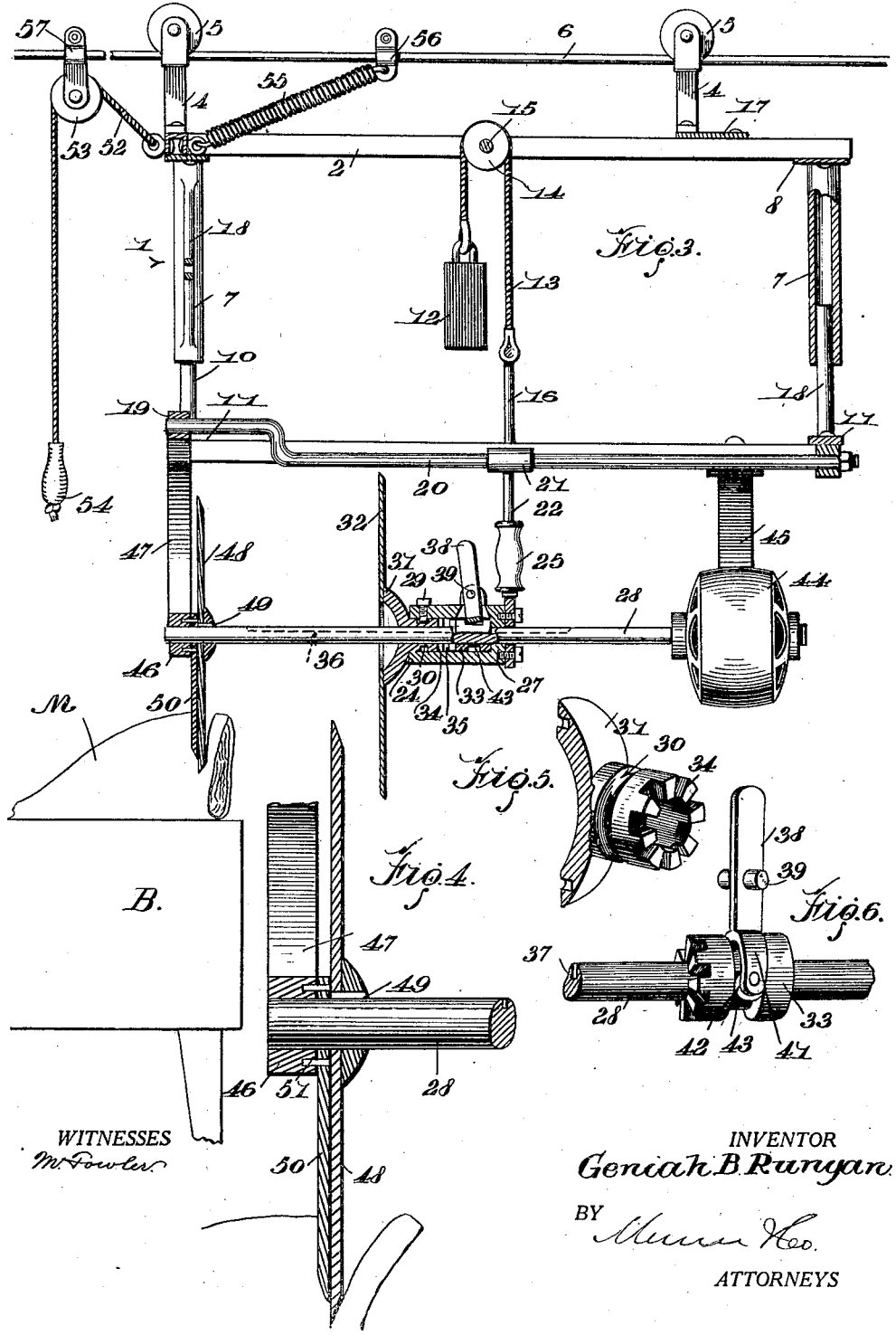
WITNESSES  
M. Fowler
INVENTOR  
Geniah B. Runyan  
BY  
ATTORNEYS Patented Feb. 12, 1924.

1,483,617

UNITED STATES PATENT OFFICE.

GENIAH B. RUNYAN, OF KUSA, OKLAHOMA.

MEAT CUTTER.

Application filed May 22, 1923. Serial No. 640,759.

*To all whom it may concern:*

Be it known that I, GENIAH B. RUNYAN, a citizen of the United States, and a resident of Kusa, in the county of Okmulgee and State of Oklahoma, have invented certain new and useful Improvements in Meat Cutters, of which the following is a specification.

My invention relates to improvements in meat cutters and it consists of the constructions, combinations and arrangements herein described and claimed.

An object of the invention is to provide a meat cutting apparatus which is mounted on an overhead support and which is so arranged that it may be pulled into a cutting position and when released will move back into the original position.

A further object of the invention is to provide a meat cutting apparatus which is mounted on an overhead cable or wire upon which it is adapted to travel back and forth into the operative and out-of-the-way positions.

A further object of the invention is to provide a meat cutting apparatus consisting of a framework which carries all of the essential elements, this framework being mounted to run on an overhead cable or wire.

A further object of the invention is to provide a meat cutting apparatus in which the bone saw is separate from the meat cutting blade, the clutch by which the saw is operated being entirely independent of the handle which slides the saw back and forth, thereby permitting sliding the saw whether it is in revolution or not.

Figure 1:
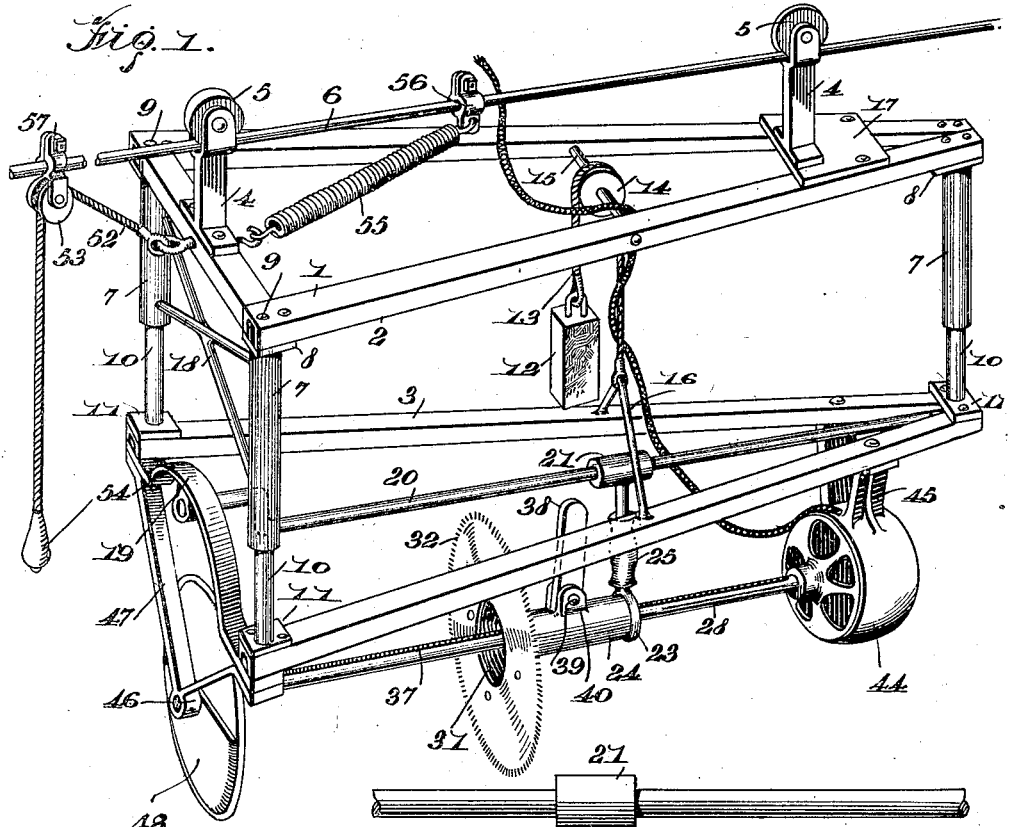
Figure 2:
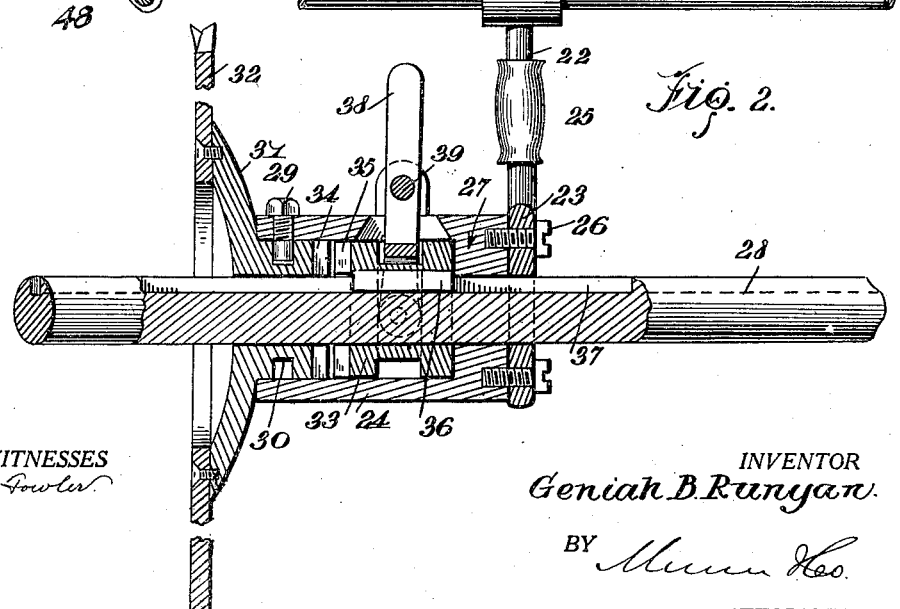

Other objects and advantages will appear in the following specification, reference being had to the accompanying drawings, in which:

Fig. 1 is a perspective view illustrating the general appearance of the improved meat cutter, Fig. 2 is a detail longitudinal section of the bone saw and its associated clutch and sliding means, Fig. 3 is a longitudinal section of the entire apparatus, some of the parts being shown in elevation, Fig. 4 is a detail section of the meat cutting blade and its associated bearing, Fig. 5 is a detail sectional perspective view of the clutch hub on the saw, and Fig. 6 is a detail perspective view of the slidable clutch by means of which the saw hub is connected to the motor shaft.

The meat cutter herein disclosed is an improvement on the meat cutter disclosed in my allowed application Serial No. 580,-814, filed Aug. 9, 1922. The meat cutter in this application is portable, that is to say, it consists of a small frame which carries the cutting blade and bone saw, there being a flexible shaft between the shaft which carries these blades and an operating electric motor. The apparatus in the present application is an improvement over the old construction. The operating motor, the two blades, and other parts of the mechanism, are mounted on a frame which, itself, is carried by an overhead wire. All that the operator has to do is to pull the frame toward him when it is desired to cut meat or a bone, none of the weight of the apparatus being imposed upon him as in the case of the portable cutter.

The construction comprises a frame which is generally designated 1. This frame consists of upper and lower sections 2 and 3 respectively, which are of corresponding diverging shapes, (Fig. 1) the upper one of which carries a pair of standards 4 which are suitably shaped at the upper ends to carry the grooved pulleys 5 by means of which the frame is mounted to run on the overhead wire 6. No means of fastening the ends of this wire are shown but the use of hooks, eye bolts, suspended rods, etc., seems so obvious that illustration is unnecessary. The wire 6 should be stretched tightly and must also be of sufficient tensile strength that it will not sag unduly under the weight of the meat cutter.

Pendent from the upper section 2 are three tubes 7. These are fixed beneath the section 2 in any suitable manner, one way of accomplishing the fastening being to provide each tube with a plate 8 through which bolts or rivets 9 may be conveniently passed in order to fasten them and the section 2 together. Slidable in the tubes 7 are rods 10. These are carried by similar plates 11 which in this case are mounted on top of the lower section 3.

The tubes 7 and rods 10 provide telescopic connections which insure a uniform up and down motion of the lower section 3 when the operator either lifts up or presses down on the lower section. The weight of the lower section is counterbalanced by a block of metal or other suitable material 12, suspended by a cord 13 which runs over a grooved pulley 14 on a rod 15 on the upper section 2. The other end of the cord 13 is suitably attached to the section 3, for example, by means of a bent rod 16. The purpose of the counterweight 12 is precisely like that of the counterweight in the ordinary window frame. It enables lifting the section 3 up and down so as to either remove the cutting blades or introduce them to the meat.

A number of braces rigidify the various parts of the frame 1. For example, the upper section 2 is reinforced by a plate 17, the front tubes 7 are strengthened by crossed rods 18 and the front of the lower section 3 is strengthened by a curved bar 19. This bar is useful in supporting one end of a slide rod 20 upon which a collar 21 is adapted to slide back and forth. This collar has a pendent rod 22 which terminates in a plate 23 by means of which connection is made with a clutch sleeve 24. The rod carries a handle 25 so that it may be conveniently grasped by the operator and moved back and forth. The plate 23 is secured to the sleeve 24 by means of a screw 26. The sleeve has a rather heavy closed end 27 into which the screws 26 are threaded and which provides a base of ample proportions for sliding on the motor shaft 28.

A screw 29 at the front of the sleeve 24 is adapted to occupy the groove 30 in the saw hub 31 and thus provide a swivel mounting for the saw blade 32. This blade is circular as shown. The motor shaft 28 may revolve independently of the hub 31 without affecting the saw. It is only when the clutch 33 is moved toward the hub 31, that the blade 32 is made to revolve with the motor shaft. For this purpose, both the hub 31 and the clutch 33 have teeth 34 and 35 respectively.

The hub carries a key 36 which occupies a groove 37 running lengthwise of the motor shaft 28, the purpose being to cause the clutch to revolve always and still be slidable along the shaft. The clutch is controlled by a handle 38 which is pivoted at 39 in a bearing 40 on the sleeve 24, the bifurcated end 41 (Fig. 6) of the handle carrying rollers 42 which are located in a circular groove 43 in the clutch. The position of the sleeve 24 is fixed, so far as rotation is concerned, by its attachment to the plate 23 of the rod 22. Therefore, the handle 38 is also fixed. A movement of the handle 38 in opposite directions will either connect the saw 32 with the shaft 28 or disconnect it therefrom.

A motor 44 drives the shaft 28. In fact, the shaft 28 is the motor shaft. The motor is supported pendently from the section 3 by means of brackets 45. The front end of the motor shaft 28 is supported in a bearing 46 (Fig. 4) which may be described as part of the section 3 inasmuch as it is carried by the brackets 47 which extend down beneath the arch 19 (Fig. 1). A circular knife blade 48 is keyed at 49 to the shaft 28 adjacent to a thin guard plate 50 which is fixed at 51 to the bearing 46. The fastening means 51 may consist of plain dowels. The guard 50 permits making the blade 48 exceptionally thin so that finer cuts may be made, that the blade may be manufactured more cheaply and that less power at the motor 44 will be required to turn the knife blade.

Fastened to the front of the upper section 2 is a cord 52 which runs over a pulley 53 and has a handle 54 within convenient reach of the operator. The purpose of the handle and cord is to permit pulling the frame 1 forwardly so as to bring the blade 48 into position to cut the meat M on the block B. The pulling of the cord 42 is done against the tension of a spring 55 which is intended to hold the frame back in a predetermined normal position away from the block B.

One end of the spring 55 is attached to the frame 1 while the other end is attached to a clamp 56 on the wire 6. Similarly a clamp 57 supports the pulley 53. These clamps may be moved if desired. For example, the user of the meat cutter may desire to station the apparatus in a different predetermined normal position in respect to the meat block and in such event he will doubtless find it necessary to unloosen the clamps 56 and 57 and move them to a different position along the wire 6.

The operation may be readily understood after a brief review. It has already been stated that the frame 1 is intended to occupy a predetermined normal position on the wire 6 and in respect to the meat block B. The lower section 3 may be raised up and down so as to either get the blades 48 and 32 out of the way or bring them into such positions that they will register with the meat M. The weight 12 is a counterweight which is adapted to support the section 3 and its carried parts in any adjusted position.

Assume that the operator has pulled the section 3 down such a distance that the edge of the circular knife 48 will touch the upper surface of the meat M. He will bear down on the section 3 so as to accomplish the cut. As soon as the bone is reached, the saw 32 must be brought forwardly. This is done by grasping the handle 25 and sliding both and collar 21 and sleeve 24 along the rod 20 and shaft 28 respectively. The saw 32 remains stationary up to the time that the handle 38 is thrown backward. This will move the clutch 33 into engagement with the saw hub 31 so that the rotating shaft 28 will have connection with the saw and cause the latter to rotate.

The saw 32 may be slid back and forth along the motor shaft 28 regardless of whether the clutch 33 is in or out. The shaft 28 is capable of rotating independently of the saw. The hub part 27 of the sleeve 24 furnishes a bearing which guards against any possible sagging of the shaft 28 in the middle.

As soon as the bone is sawn through, the clutch 33 may again be disengaged, the handle 25 slid back and the blade 48 pressed down until the entire slice is cut off. It is necessary that the knife blade 48 be capable of swinging transversely of the meat M. The frame 1 is capable of rocking in respect to the wire 6, the grooved pulleys 5 functioning as hinges for this purpose. The handle 54 is for the purpose of pulling the entire frame forwardly as far as may be necessary for the blades 48 and 32 to reach the meat. Upon release of the handle 54 the spring 55 draws the frame and its carried parts back to a predetermnied normal position. This position may be varied by undoing the clamps 56 and 57 and moving them to new positions along the wire 6.

While the construction and arrangement of the improved meat cutter as herein described and claimed, is that of a generally preferred form, obviously modifications and changes may be made without departing from the spirit of the invention or the scope of the claims.

I claim:—

1. A meat cutter comprising a rotary knife for making the initial cut, a rotary saw normally spaced from the knife to make room for the knife, means by which the saw is moved into close proximity to the knife for the cutting of a bone when reached, a shaft upon which the knife and saw are mounted and means by which the saw may be clutched to and from the shaft at will.

2. A meat cutter comprising a knife, a shaft upon which it is fixed for rotation, a saw loose upon the shaft, means by which the saw may be slid along the shaft in respect to the knife, and means by which the saw may be clutched to the shaft in any position thereof along the shaft so as to revolve with the knife.

3. A meat cutter comprising a circular blade, a shaft upon which it is mounted for continuous rotation, a circular saw, a hub by which the saw is loosely mounted on the shaft including a handle by which the saw may be slid along the shaft in respect to the blade, and a clutch by which the hub may be fixed to the shaft in any position of adjustment of the saw in respect to the blade.

4. A cutter comprising a circular blade, a continuously revoluble shaft to which the blade is fixed, a circular saw, a hub carrying the saw loosely on the shaft, a sleeve into which the hub extends and with which it has a swivel connection, a handle attached to the sleeve adapted for sliding the hub along the shaft so that the saw may assume any desired position in respect to the blade, a clutch concealed by the sleeve but having a slidable connection with the shaft, and a handle exposed on the sleeve by means of which the clutch may be engaged with the hub so that the saw may be driven or stopped.

5. A cutter comprising a circular blade, a continuously revoluble shaft upon which the blade is fixed, a circular saw, a hub by means of which the saw is loosely mounted on the shaft, said hub having a groove, a sleeve having an open end to receive the grooved hub and a solid end which furnishes a base for the sleeve on the shaft, a handle attached to the sleeve by means of which the saw may be slid along the shaft in respect to the blade, means carried by the sleeve engaging the groove to furnish a swivel connection, a clutch concealed in the sleeve and having a slidable key connection with a groove in the shaft, and an operating handle pivoted on the sleeve but engaging the clutch to permit moving the clutch into and out of engagement with the hub so as to drive the saw when desired.

6. A cutter comprising knife and saw blades respectively for cutting meat and bone, a frame section by which said blades are supported, a second frame section by which the first section is carried and in respect to which the second frame section is movable, and counter-balancing means fitted between said sections permitting raising and lowering of the first section and insuring that it remains at any particular position.

7. A cutter comprising knife and saw blades, a frame by which they are carried comprising a lower section upon which they are operatively mounted, an upper section in respect to which the lower section is vertically movable so that the blades may be adjusted as desired, counter-balancing means by means of which the lower section remains in any adjusted position, and an overhead structure upon which the frame is movable to permit longitudinal movement of said blades.

8. A cutter comprising knife and saw blades, a frame by which they are carried, an overhead structure, means including a pulley on the frame by which it is adapted to run on said overhead structure, means by which the frame may be pulled in one direction to move it on said overhead structure, and means which opposes said pulley being adapted to return the frame when said pull is released.

9. A cutter comprising knife and saw blades, a frame by which they are carried, pulleys carried by the frame, an overhead structure upon which the pulleys are adapted to run permitting forward and backward adjustment of the frame and consequently of the blades, a cord by which the frame may be drawn forwardly, a spring which opposes said pulley and which is adapted to pull the frame back when the cord is released, a pulley over which the cord runs, and clamp means by which said pulley and one end of the spring respectively are attached to said overhead structure, said clamp means being adapted to be shifted when the position of the frame is desired to be changed in respect to said structure.

10. A cutter comprising knife and saw blades, a frame by which they are carried comprising a lower section upon which said blades are mounted, an upper frame section, means by which said section is adapted to run on an overhead structure, telescopic connecting means between said sections permitting a relative up and down adjustment of the lower section, and a weight for counter-balancing the lower section being adapted to hold it in any position of adjustment, said weight having a cord attached to the lower section but running over a pulley carried by the upper section.

11. A cutter comprising a frame, a rod which constitutes a part of the bracing of the frame, a motor supported by the frame and having a shaft, a circular knife blade fixed on said shaft for continuous rotation when the motor operates, a circular saw, means by which it is slidably carried on the shaft, means having connection with both said slidable carrier and said rod the latter connection serving as a guide, and means whereby the saw blade may be clutched and unclutched in respect to the shaft at any slid position.

12. A cutter comprising a frame, a motor suspended from the frame, a drive shaft, a bracket suspended from the frame including a bearing in which the opposite end of the shaft is journalled, a circular knife blade fixed on the shaft adjacent to said bracket, and a guard plate pendent from the bearing close to the blade serving to strengthen said blade and permitting the use of smaller and better blades than if such guard were not provided.

13. A cutter comprising a knife, a motor shaft upon which it is fixed for rotation, a saw loose upon the shaft, a slide rod spaced from but in parallelism with the motor shaft, means by which the saw may be clutched to the shaft at various positions in respect to the knife, and means by which the saw may be slid along the shaft including a collar carried by the slide rod and a handle which is adapted to be grasped.

14. A cutter comprising a knife, a motor shaft upon which it is fixed for rotation, a slide rod parallel to the shaft, a saw loose upon the shaft, means including a sleeve with which the saw has swivel connection and by which the saw may be slid along the shaft beneath said rod, other means by which said sliding is accomplished including a collar on the rod and a pendant rod connecting the collar with the sleeve, said rod having a handle, and means carried by the sleeve by which the saw may be clutched to the motor shaft in any position thereof in respect to the knife.

15. A cutter comprising a frame section having rails diverging from a connecting point, a bar connecting the ends of the rails, a slide rod extending from said bar to the point of connection of the rails, brackets pendant from the frame section carrying a bearing below the slide rod, a motor carried adjacent to the connecting point of the rails and having a shaft which is supported in said bearing, a knife fixed on the shaft for rotation, a saw loose on the shaft, means to clutch the saw to the shaft at various locations, and means disposed between the saw and the slide rod adapted to be grasped to move the saw between the motor and the knife.

GENIAH B. RUNYAN.